US011951600B2

(12) United States Patent
Spampatti

(10) Patent No.: US 11,951,600 B2
(45) Date of Patent: Apr. 9, 2024

(54) SETTING TOOL SYSTEM FOR ANCHORING SYSTEMS

(71) Applicant: HILTI AKTIENGESELLSCHAFT, Schaan (LI)

(72) Inventor: Matteo Spampatti, Buchs (CH)

(73) Assignee: HILTI AKTIENGESELLSCHAFT, Schaan (LI)

( * ) Notice: Subject to any disclaimer, the term of this patent is extended or adjusted under 35 U.S.C. 154(b) by 674 days.

(21) Appl. No.: 17/254,381

(22) PCT Filed: Jun. 27, 2019

(86) PCT No.: PCT/EP2019/067175
§ 371 (c)(1),
(2) Date: Dec. 21, 2020

(87) PCT Pub. No.: WO2020/007706
PCT Pub. Date: Jan. 9, 2020

(65) Prior Publication Data

US 2021/0245343 A1 Aug. 12, 2021

Related U.S. Application Data

(60) Provisional application No. 62/693,531, filed on Jul. 3, 2018.

(51) Int. Cl.
*B25B 31/00* (2006.01)
*B25D 1/16* (2006.01)

(52) U.S. Cl.
CPC ................ *B25B 31/00* (2013.01); *B25D 1/16* (2013.01)

(58) Field of Classification Search
CPC .................................. B25B 31/00; B25D 1/16
(Continued)

(56) References Cited

U.S. PATENT DOCUMENTS 3,952,398 A 4/1976 Haytayan
3,960,191 A * 6/1976 Murray .................. B25B 23/06 81/57.37
(Continued)

FOREIGN PATENT DOCUMENTS

CN 104395617 A 3/2015
DE 4009573 A1 9/1991
(Continued)

OTHER PUBLICATIONS

International Search Report in International Application No. PCT/EP2019/067175, dated Oct. 11, 2019.

*Primary Examiner* — Hadi Shakeri
(74) *Attorney, Agent, or Firm* — Leydig, Voit & Mayer, Ltd.

(57) ABSTRACT

A setting tool system includes a housing. The housing includes a first conduit that receives one or more anchoring systems at a first end, and a second conduit at least partially separated from the first conduit with an interior wall. The second conduit includes a weighted shaft that moves freely within the length of the second conduit. The first and second conduits merge at a second end opposite the first end. The housing also includes a head having an opening at the second end. Each of the one or more anchoring systems inserted at the first end are individually received at the opening at the second end. Each anchoring system contacts the weighted shaft at a top surface, and contacts an external surface at a bottom surface. Each of the one or more anchoring systems are individually fastened via the weighted shaft to the external surface.

8 Claims, 3 Drawing Sheets

(58) Field of Classification Search
USPC .......................................................... 81/44, 27
See application file for complete search history.

(56) References Cited

U.S. PATENT DOCUMENTS

| | | | | |
|---|---|---|---|---|
| 5,044,519 | A * | 9/1991 | Aoyama | B25C 1/001 221/212 |
| 5,199,625 | A * | 4/1993 | Dewey | B25C 1/184 227/139 |
| 5,815,906 | A | 10/1998 | Johnsen | |
| 7,191,685 | B2 * | 3/2007 | Lowther | B25B 27/02 81/463 |
| 8,636,186 | B2 | 1/2014 | Shinjo | |
| 9,810,254 | B2 | 11/2017 | Eckstein et al. | |
| 10,160,108 | B2 | 12/2018 | Beck | |
| 2004/0006861 | A1 | 1/2004 | Haytayan | |
| 2011/0297724 | A1 | 12/2011 | Shinjo | |
| 2015/0135511 | A1 | 5/2015 | Eckstein et al. | |
| 2016/0167210 | A1 | 6/2016 | Beck | |
| 2017/0057070 | A1 | 3/2017 | Masas et al. | |
| 2019/0285105 | A1 * | 9/2019 | Wiley | F16B 13/124 |

FOREIGN PATENT DOCUMENTS

| | | | |
|---|---|---|---|
| EP | 0449709 | A1 | 10/1991 |
| EP | 0 699 279 | B1 | 3/1999 |
| EP | 3192614 | B1 | 4/2019 |
| TW | 201507826 | A | 3/2015 |
| TW | 1558516 | B | 11/2016 |

* cited by examiner

SETTING TOOL SYSTEM FOR ANCHORING SYSTEMS

CROSS-REFERENCE TO RELATED APPLICATIONS

This patent application is the U.S. National Stage of International Patent Application No. PCT/EP2019/067175, filed Jun. 27, 2019, which claims the benefit of U.S. Patent Application No. 62/693,531, filed Jul. 3, 2018, which are each incorporated by reference.

BACKGROUND

The present disclosure relates generally to the field of anchoring systems, and more particularly to a setting tool configured to install anchoring systems during deck construction. Specifically, the present embodiments are related to a setting tool that improves the efficiency and ease of installing various anchoring systems to a concrete deck.

In typical construction sites, deck construction (e.g., decking) is often utilized to build the floors and ceilings of multiple story buildings. In such buildings, anchoring systems may be installed to suspend various construction elements (e.g., pipes, sprinkler systems, HVAC components, conduits, electrical elements, etc.) from the ceiling. In certain situations, the anchoring systems may be positioned during the construction of the deck, before concrete is poured. For example, a wood form, a fluted, and/or a corrugated metal sheet of alternating peaks and valleys may be installed as a base. Further, various anchoring systems are positioned throughout the deck based on the desired function and position of the construction elements that the anchoring systems are configured to support within the building. After the anchoring systems are properly positioned in the base, concrete is poured over the base, thereby securing and embedding the anchoring system. After formation of the deck (e.g., the floors and ceilings of the building), a male or female connection may be threaded into the anchoring system to securely suspend or fasten the construction element from the ceiling.

In certain situations, an installer may individually install each anchoring system by bending over, positioning the anchoring system on the deck, and securing the anchoring system to the deck with a tool (e.g., hammer). However, such techniques are time consuming because a typical construction site may require a vast number of anchoring systems positioned at precise locations on the deck. Further, in some situations, it may be difficult for the installer to find the space to bend over with a tool (e.g., hammer) to position the anchoring system at a precise location. Accordingly, there is a need for a setting tool that improves the efficiency and ease of installing anchoring systems on decks. Specifically, there is a need for a stand-up setting tool that allows the installer to install one or more anchoring systems without repeatedly bending over and without compromising the quality of the installation.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a setting tool system includes a housing. The housing includes a first conduit that receives one or more anchoring systems at a first end, and a second conduit at least partially separated from the first conduit with an interior wall. The second conduit includes a weighted shaft that moves freely within the length of the second conduit. The first and second conduits merge at a second end opposite the first end. The housing also includes a head having an opening at the second end. Each of the one or more anchoring systems inserted at the first end are individually received at the opening at the second end. Each anchoring system contacts the weighted shaft at a top surface, and contacts an external surface at a bottom surface. Each of the one or more anchoring systems are individually fastened via the weighted shaft to the external surface.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figures 1, 2:
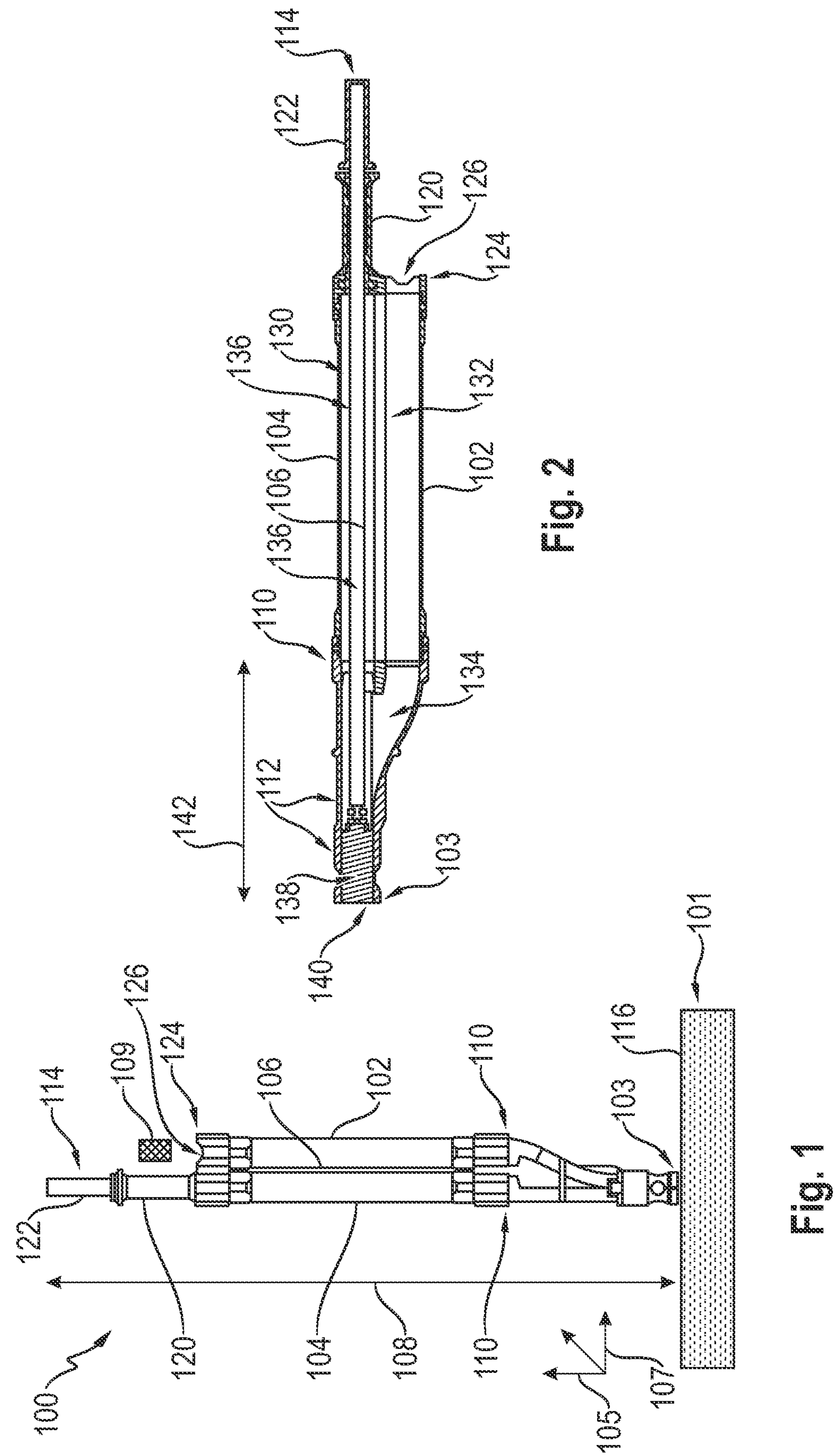
FIG. 1 is perspective view of an embodiment of a setting tool system having a feeding tube and a setting tube, where the feeding tube and the setting tube are coupled along an exterior surface of least a portion of the length of the setting tool system.
FIG. 2 is a cross-sectional view of an embodiment of the setting tool system of FIG. 1, illustrating a setting tool (e.g., manually actuated hammer) disposed within the setting tube of the setting tool system.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Present embodiments are directed to a setting tool system that is configured to improve the efficiency and ease of installing one or more anchoring systems on a concrete deck system. Specifically, as noted above, the setting tool system is a stand-up setting tool system that is configured to be utilized by an operator who is standing. Indeed, rather than an operator install each anchoring system by bending over, positioning the anchoring system on the deck, and securing the anchoring system on the deck with a tool (e.g., hammer), the setting tool system allows the operator to remain standing during the installation of each anchoring system. Specifically, the operator may feed one or more anchoring systems into the setting tool system, physically move to the desired location of installation on the deck, release a single anchoring system via a trap door mechanism within the setting tool system, and manually actuate a setting tool (e.g., hammer) within the setting tool system to install (e.g., securely fasten) the released anchoring system to the deck. Further, the operator may repeat this process as needed, either by feeding another anchoring system into the setting tool system and/or by moving to the next installation location on the deck. In this manner, the setting tool system improves the efficiency of the operator, at least in part because the operator does not need to bend over to individually install each anchoring system within the deck. Further, in certain embodiments, the setting tool system improves the efficiency and ease of installation at least in part because the operator may preload and prepare one or more anchoring systems into the setting tool system rather than prepare each anchoring system at the site of the install. For example, in certain embodiments, the setting tool system may be pre-loaded with one or more anchoring systems (e.g., 1, 2, 3, 4, 5, 6, 7, 8, 9, 10, etc.), allowing the operator to move between fastening locations on the deck. In this manner, the anchoring system may be prepared or preloaded prior to installation, thereby providing the operator with greater flexibility in the work flow.

Turning now to the drawings, FIG. 1 is a perspective view of an embodiment of a setting tool system 100 for installing anchoring systems 109 into a deck system 101. In certain embodiments, the setting tool system 100 is configured to be utilized by an operator standing up, such that the operator may continuously install one or more anchoring systems 109 into the deck system 101, without repeatedly pausing to bend over and/or preload and/or prepare the anchoring systems 109.

In the illustrated embodiment, the setting tool system 100 includes a feeding tube 102 coupled to a setting tube 104. In certain embodiments, the feeding tube 102 and the setting tube 104 may be hollow conduits that are parallel to a longitudinal axis 105 of the setting tool system 100. During use, an operator may position the setting tool system 100 approximately perpendicular to the deck system 101, which may be along a horizontal axis 107, such that the setting tool system 100 is positioned to operate "standing up." Specifically, during operation, the head 103 of the setting tool system 100 may be configured to make physical contact with a top surface 116 of the deck system 101. In certain embodiments, the feeding tube 102 and the setting tube 104 are coupled via the housing of the setting tool system. Further, in certain embodiments, the feeding tube 102 may be separated from the setting tube 104 via an interior wall 106 of the housing, where the interior wall 106 is at least a portion of the length 108 of the setting tool system 100. Further, the hollow conduits of the feeding tube 102 and the setting tube 104 may merge together at a second end 110 of the setting tool system 100, such that the two channels merge together to form a single channel or conduit. In certain embodiments, the cross-sectional diameter of the merged conduit may be approximately the same size as the cross-sectional diameter of the setting tube 104. Accordingly, an anchoring system 109 fed through the feeding tube 102 may travel through the hollow conduit and be positioned at an opening of the head 103 of the setting tool system 100, thereby making direct contact with the top surface 116 of the deck system 101, as further described with respect to FIGS. 3-5.

In certain embodiments, the setting tool system 100 includes a setting tool 112 (e.g., hammer 112) (illustrated in FIG. 2) coupled to a manually adjustable handle 114. In particular, the setting tool 112 may be disposed within the setting tube 104, and may be configured to slide along a portion of the length of the setting tube 104. In other words, an operator engaging the handle 114 may move the setting tool 112 within the hollow conduit upwards and downwards along the vertical axis 105. In certain embodiments, as the operator engages the setting tool 112, the weight of the setting tool 112 (e.g., hammer 112) impacts an anchoring system 109 positioned at the head 103, and repeated impacts to the anchoring system 109 may help fasten the anchoring system 109 into a desired location on the deck 116. For example, in certain embodiments, the setting tool 112 may be configured to repeatedly move a distance 142 (illustrated in FIG. 2), which may be a portion of the distance 108, to help fasten the anchoring system 109 into the deck 116, as further described with respect to FIGS. 3-5, as further described with respect to FIGS. 3-5. In certain embodiments, the handle 114 may be ergonomically designed for each hand of the operator (e.g., first hand support 120 and second hand support 122), so that the operator may be comfortable supporting the setting tool system 100 while engaging the setting tool 112 along the vertical axis 105.

In certain embodiments, the setting tool system 100 includes a feeding tube 102 having a first end 124 with an aperture 126 configured for receiving the one or more anchoring systems 109. In certain embodiments, the anchoring systems 109 may be various sizes and shapes, depending on the desired function of the construction element (e.g., pipes, sprinkler systems, HVAC components, conduits, electrical elements, etc.) the anchoring system is configured to support. For example, in certain embodiments, the anchoring system 109 may be a cast-in anchor of any size or shape, such as a cast-in anchor having threads configured as: ¼"-⅜", ⅜"-½", ⅜"-½"-⅝", ½"-⅝"-¾", ⅝"-¾", or ⅜"-½"-⅝"-¾".

In certain embodiments, the operator may insert a single anchoring system 109 into the feeding tube 102, and secure the single anchoring system 109 to the deck system 101 via the setting tool system 100, before inserting and installing a subsequent anchoring system 109. In certain embodiments, the operator may feed one or more anchoring systems 109 through the feeding tube 102 at the same time, such that a series of anchoring systems 109 are stacked within the hollow conduit of the setting tool system 100. For example, the operator may desire to preload and prepare a desired number of anchoring systems 109 into the feeding tube 102. After the preloading and/or preparing, the operator may continuously fasten the preloaded anchoring systems 109 to the deck system 101. In certain embodiments, the anchoring systems 109 may be configured with one or more features (e.g., attachments, fasteners, preformed holes, preformed indentations, etc.) that allow each anchoring system 109 to be stacked on the previous anchoring system 109 within the series. Further, in certain embodiments, the same type (e.g., size and shape) of anchoring system 109 may be utilized when a series of anchoring systems 109 are preloaded and/or prepared within the hollow conduit of the feeding tube 102. However, in other embodiments, any type (e.g., size or shape) of anchoring system 109 may be utilized when a series of anchoring systems 109 are utilized within the feeding tube 102.

FIG. 2 is a cross-sectional view of an embodiment of the setting tool system 100 of FIG. 1, illustrating a setting tool 112 (e.g., manually actuated hammer) disposed within the setting tube 104 of the setting tool system 100. Specifically, the setting tube 104 includes a first hollow conduit 130 that is substantially parallel to a second hollow conduit 132 of the feeding tube 102. In particular, the first and second hollow conduits 130, 132 may be independent chambers substantially parallel to each other until they merge at a merging chamber 134 disposed at the second end 110 of the setting tool system 100. Specifically, the second hollow conduit 132 of the feeding tube 102 is configured to merge into the first hollow conduit 130, such that each of the one or more anchoring systems 109 are configured to travel from the receiving aperture 126 the first hollow conduit 130 from the second hollow conduit 132.

In certain embodiments, the setting tool 112 may be a manually actuated hammer that is disposed within the setting tube 104 of the setting tool system 100. Specifically, the setting tool 112 may comprise a shaft portion 136 coupled to a weight portion 138. The shaft portion 136 may extend through the handle 114 of the setting tool system 100, such that engaging the handle 114 engages the shaft portion 136 and the weight portion 138. As noted above, the weight portion 138 of the setting tool 112 may be configured to fasten the anchoring system 109 into the deck system 101. For example, as further described with respect to FIGS. 3-5, the anchoring system 109 positioned at the opening 140 of the head 103 of the setting tool system 100 may be fastened into the deck system 101 via the vertical movement of the setting tool 112. It should be noted that the cross-sectional area of the head 103 and/or the opening 140 is smaller than the cross-sectional area of the feeding tube 102 and the setting tube 104 at the first end 124. Indeed, the smaller cross-sectional area of the head 103 and/or the opening 140 allows the installer to reach tight spaces on the deck system 101.

Figure 3:
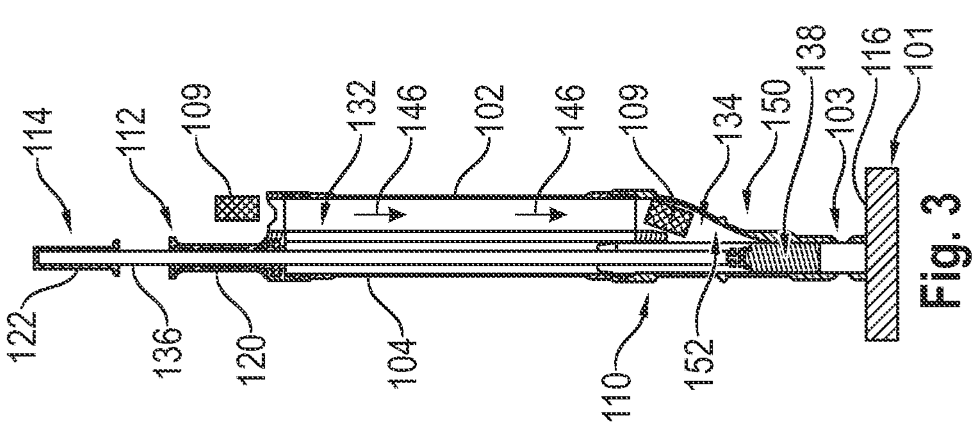
FIG. 3 is a cross-sectional view of an embodiment of the setting tool system of FIG. 1, illustrating feeding one or more anchoring systems through the feeding tube of the setting tool system.

FIG. 3 is a cross-sectional view of an embodiment of the setting tool system 100 of FIG. 1, illustrating inserting one or more anchoring systems 109 through the feeding tube 102 of the setting tool system 100. As noted above, in certain embodiments, one or more anchoring systems 109 (e.g., 1, 2, 3, 4, 5, 6, 7, 8, 9, 10, or more) of various sizes or types may be inserted into the hollow conduit 132 of the feeding tube 102 via the aperture 126. The aperture 126 may be configured to receive any type (e.g., size and shape) of the anchoring system 109. In certain embodiments, the aperture 126 may include a removable cover to close the aperture from debris or other wanted materials. Once inserted into the feeding tube 102 via the aperture 126, the anchoring system 109 may travel down (via gravity) to a resting point at some location within the feeding tube 102. For example, in certain situations, the anchoring system 109 may travel in a downward direction 146 to the base of the feeding tube 102 (e.g., a loading position 150), where the first and second hollow conduits 130, 132 merge at the merging chamber 134.

In particular, it should be noted that when the anchoring system 109 is located at the base of the feeding tube 102, the anchoring system 109 is at the "loading" position 150 for the anchoring system 109. In other words, the anchoring system 109 located at the base position 150 is set to be the next anchoring system 109 utilized and installed by the operator via the setting tool system 100. The loading position 150 is additionally a resting position where the anchoring system 109 may be positioned while the operator is moving from one installation location on the deck system 101 to another. Specifically, when the anchoring system 109 is in the loading position 150, the trap door 152 of the setting tool system 100 may be in a "closed" position (e.g., the trap door 152 prevents further movement of the anchoring system 109 in the downward direction 146). In certain embodiments, the trap door 152 may be a portion of the outer wall of the housing enclosing the shaft 136, and the trap door 152 may be configured to move within the setting tube 104 in the vertical direction. For example, the trap door 152 may be moved to an "open" position when the operator engages the handle 114 to move the shaft portion 136 away from the deck system 101 when the setting tool system 100 is positioned normal to the deck system 101, as further described with respect to FIG. 4.

Figure 4:
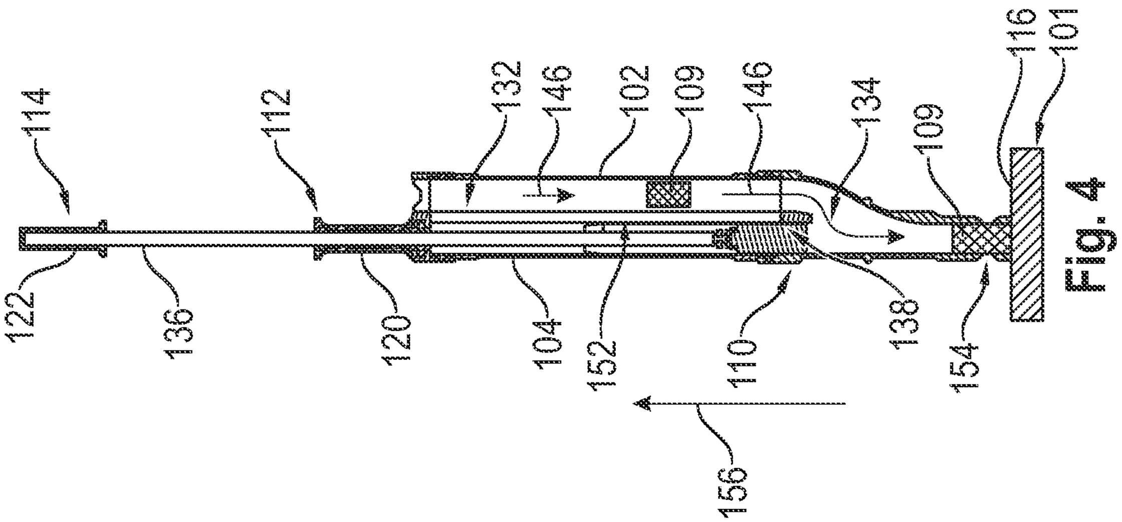
FIG. 4 is a cross-sectional view of an embodiment of the setting tool system of FIG. 1, illustrating the release of a trap door mechanism such that an anchoring system is released into position on the deck.

FIG. 4 is a cross-sectional view of an embodiment of the setting tool system 100 of FIG. 1, illustrating the release of the trap door 152 such that the anchoring system 109 is released into an installation position 154 on the top surface 116 of the deck system 101. As noted above, the trap door 152 may be moved to an "open" position when the operator engages the handle 114 to move the shaft portion 136 away from the deck system 101 (e.g., upward direction 156 opposite the downward direction 146) when the setting tool system 100 is positioned normal to the deck system 101. Indeed, opening the trap door 152 opens the merging chamber 134, such that the first and second hollow conduits 130, 132 merge into a single chamber that opens into the opening 140 of the head 103. Accordingly, when the trap door 152 is in the "open" position, the anchoring system 109 continues to move in the downward direction 146 without any obstructions, resulting at the installation position 154. When the anchoring system 109 is in the installation position 154, the operator may engage the handle 114 to bring the weight of the setting tool 112 onto the anchoring system 109 in the installation position 154, as further explained with respect to FIG. 5.

Figure 5:
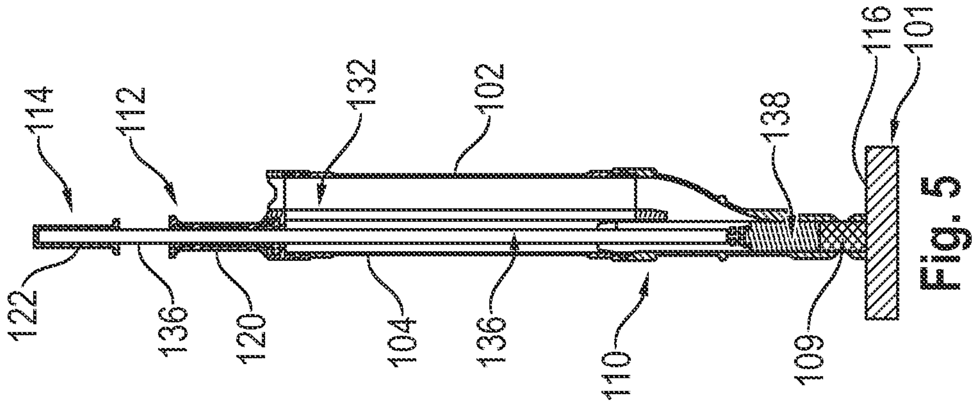
FIG. 5 is a cross-sectional view of an embodiment of the setting tool system of FIG. 1, illustrating the installation of the anchoring system on the deck via the manual actuation of the hammer.

FIG. 5 is a cross-sectional view of an embodiment of the setting tool system 100 of FIG. 1, illustrating the installation of the anchoring system 109 on the deck system 101 via the setting tool 112. As noted above, in certain embodiments, the setting tool 112 disposed within the setting tube 104 may be manually actuated (e.g., upward and downward movements) by an operator. In certain situations, the manual actuation of the setting tool 112 may help to fasten the anchoring system 109 into the deck system 101, before concrete is poured. As noted above, the benefits of such an installation technique are greater efficiency and ease of installation for the operator, who would not have to repeatedly bend over to install each individual anchoring system 109 into the deck system 101.

Figure 6:
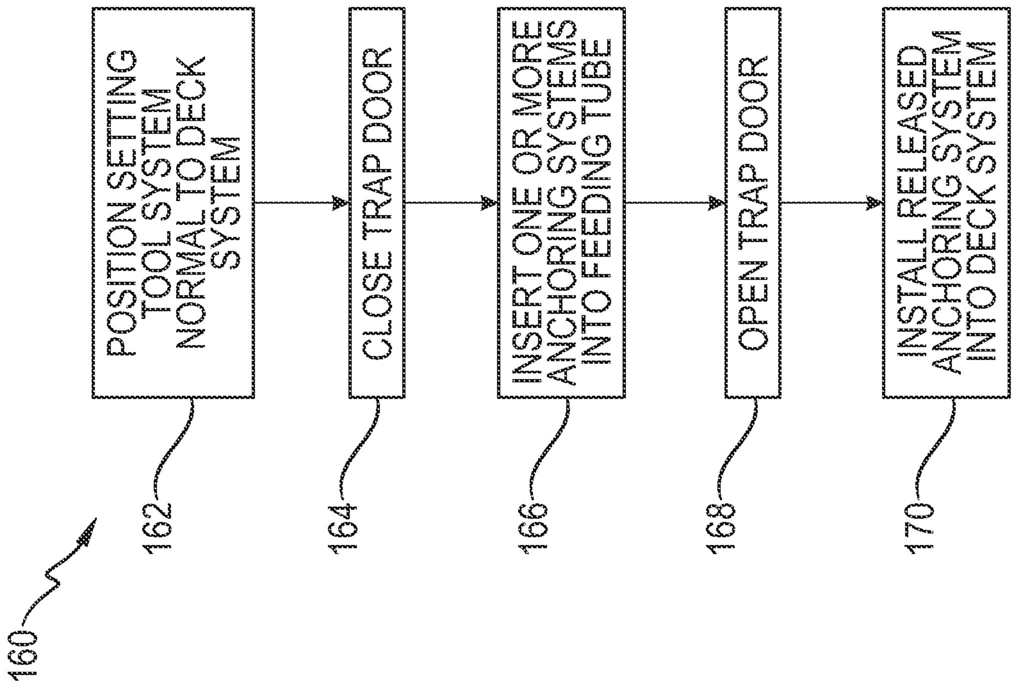
FIG. 6 is a method of installing one or more anchoring system on a deck via a setting tool system.

FIG. 6 is a method 160 of installing one or more anchoring systems 109 on the deck system 101 via the setting tool system 101. In certain embodiments, the method 160 includes positioning the setting tool system 100 normal to the deck system 101, such that an operator may utilize the setting tool system 100 while standing up (block 162). The method 160 further includes closing the trap door 152, such that the setting tool system 100 may be prepared and/or preloaded (block 164). As noted above, the trap door 152 may be moved to the closed position by engaging the handle 114 and moving the setting tool 112 (e.g., shaft portion 136) in the vertically downward position. When the trap door 152 is closed, the outer wall of the housing enclosing the shaft 136 blocks the merging of the second hollow conduit 132 with the first hollow conduit 130.

In certain embodiments, the method 160 further includes inserting one or more anchoring systems 109 into the setting tube 104 of the setting tool system 100 (block 166). In certain embodiments, the operator may insert and install the anchoring system 109 one at a time, such that no more than one anchoring system 109 is within the feeding tube 102 at any given point during operation. In certain embodiments, the operator may insert two or more anchoring systems 109 into the feeding tube 102, such that the feeding tube 102 is preloaded with a series of anchoring systems 109. The anchoring systems 109 may then be installed one at a time until the feeding tube 102 requires re-loading. In either the single anchoring system or multi-anchoring system method, the setting tool system 100 may be preloaded/preconfigured/prepared with the anchoring system 109 prior to use. Specifically, the anchoring system 109 may be inserted and rested in the loaded position 150, so that the operator may easily transport the setting tool system 100 to the desired location on the deck system 101. In this manner, the operator does not need to be at the location of installation before preparing the anchoring systems 109 for installation.

In certain embodiments, a series of anchoring systems 109 (e.g., two or more) may be pre-formed in a magazine, which may be directly inserted into the feeding tube 102. For example, the magazine may be a series of anchoring systems 109 collated such that they are stacked and secured together via an attachment strap that extends the length of the series. In this manner, one or more anchoring systems 109 may be simultaneously inserted into the feeding tube 102, thereby increasing efficiency and ease of installation.

In certain embodiments, the method 160 includes opening the trap door 152 (block 168), such that the anchoring system 109 in the loading position 150 moves into the installation position 154. Once the anchoring system 109 is within the installation position 150, the operator may engage the handle 114 to manually actuate the setting tool 112 (e.g., the shaft portion 136 and the weight portion 138) in the vertical direction, and install the anchoring system 109 into the deck system 101.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A setting tool system, comprising:

a housing, comprising:

a first hollow conduit configured to receive one or more anchoring systems at a first end;

a shaft portion coupled to a handle at a first end and coupled to a weight portion at a second opposite end to define a weighted shaft;

a second hollow conduit partially separated from the first conduit with an interior wall, wherein the second conduit comprises a length and the weighted shaft is configured to freely move within the length of the second conduit, and wherein the first and second conduits merge at a second end opposite the first end, wherein the first conduit merges with the second conduit at a merging chamber disposed proximate to the second end;

a trap door defined by a portion of the interior wall, the second end of the weighted shaft and the merging chamber; and a head comprising an opening at the second end, wherein each of the one or more anchoring systems inserted at the first end are individually received at the opening at the second end when the trap door is released by moving the weighted shaft away from the opening of the head to individually releases each of the one or more anchor systems from the first conduit to the opening in the head via the merging chamber, wherein a top surface of each of the one or more anchoring systems contacts the weighted shaft, and wherein a bottom surface of each of the one or more anchoring systems contacts an external surface, and wherein each of the one or more anchoring systems are fastened via an impact by the weighted shaft to the external surface.

2. The setting tool system of claim 1, wherein the merging chamber fluidly couples the first and second conduits to the opening of the head.

3. The setting tool system of claim 2, wherein each of the one or more anchoring systems are inserted at the first end via an aperture, and wherein each of the one or more anchoring systems travels from the first end to the opening of the head via the first conduit.

4. The setting tool system of claim 1 wherein the merging chamber is disposed between approximately 4 to 20 inches from the external surface.

5. The setting tool system of claim 1, wherein the setting tool provides a feedback to the user for anchoring system installation.

6. The setting tool system of claim 1, wherein the external surface is a wood deck.

7. The setting tool system of claim 1, wherein the one or more anchoring systems are cast-in anchors.

8. A method of installing one or more anchoring systems onto an external surface, the method comprising:

positioning the setting tool system of claim 1 such that the bottom surface of each of the one or more anchoring systems contacts the external surface;

actuating the setting tool system, including releasing the trap door; and, fastening the one or more anchoring systems onto the external surface via the weighted shaft.

* * * * *